United States Patent
Chen et al.

[11] Patent Number: 6,089,797
[45] Date of Patent: Jul. 18, 2000

[54] THERMAL EQUALIZATION SYSTEM

[75] Inventors: Yi-Qing Peter Chen, Alhambra; Gary Hoogerbrugge, Yorba Linda, both of Calif.

[73] Assignee: Excellon Automation, Co., Torrance, Calif.

[21] Appl. No.: 09/201,649

[22] Filed: Nov. 30, 1998

[51] Int. Cl.$^7$ .................................................. B23Q 11/14
[52] U.S. Cl. ........................... 408/8; 82/900; 165/206; 165/289; 165/294; 408/42; 409/135
[58] Field of Search ................................ 408/8, 42, 53; 409/135; 82/900; 165/206, 253, 259, 289, 294, 296, 297

[56] References Cited

U.S. PATENT DOCUMENTS

| | | | |
|---|---|---|---|
| 3,066,578 | 12/1962 | Olton ...................................... | 409/135 |
| 4,211,129 | 7/1980 | Wittkopp et al. . | |
| 4,534,686 | 8/1985 | Nakamura et al. . | |
| 4,580,471 | 4/1986 | Oyama et al. . | |
| 4,719,830 | 1/1988 | Kawada et al. ........................... | 82/900 |
| 4,761,876 | 8/1988 | Kosmowski ................................ | 408/3 |
| 4,808,048 | 2/1989 | Miller . | |
| 4,919,575 | 4/1990 | Yoshimi et al. . | |
| 4,952,105 | 8/1990 | Kitamura ................................ | 409/135 |
| 5,050,288 | 9/1991 | Woods . | |
| 5,145,298 | 9/1992 | Marantette . | |
| 5,150,994 | 9/1992 | Hsu . | |
| 5,197,537 | 3/1993 | Chigira et al. ......................... | 165/291 |
| 5,246,316 | 9/1993 | Smith . | |
| 5,290,130 | 3/1994 | Beretta . | |
| 5,476,137 | 12/1995 | Ochiai et al. .............................. | 165/30 |
| 5,482,409 | 1/1996 | Dunning et al. .......................... | 408/53 |
| 5,582,237 | 12/1996 | Miyano ..................................... | 82/900 |
| 5,623,857 | 4/1997 | Sakuraba . | |
| 5,664,916 | 9/1997 | Link et al. . | |

FOREIGN PATENT DOCUMENTS

6-106447  4/1994  Japan ..................................... 409/135

*Primary Examiner*—Steven C. Bishop
*Attorney, Agent, or Firm*—Henry G. Kohlmann

[57] ABSTRACT

In a thermal equalization system a machine tool carriage preferably of aluminum but which could be made of other lightweight materials, a drilling spindle housing is mounted on the carriage. At least one spindle housing is be mounted said carriage to service work pieces mounted on a tooling plate of the work table for said spindle. The chiller unit is used to provide coolant to the spindle to compensate for the heat generated by the spindle during drilling. When the spindle is not drilling, excessive cooling of the spindle can result. Accordingly, the instant invention also includes, a conductive rubber heating pad which is attached to the spindle structure to provide a heat source for the system to compensate for excessive cooling when the drill is not generating heat. The temperature control maintains the temperature between the spindle housing, carriage and work table thereby minimizing temperature expansion differentials between the drilling position and the worktable position.

25 Claims, 7 Drawing Sheets

THERMAL EQUALIZATION SYSTEM

BACKGROUND OF THE INVENTION

1. Field of the Invention

This invention relates generally to devices used for changing temperatures by either increasing the temperature or decreasing the temperature to maintain the temperature at a selected temperature level. Most specifically this invention relates to a system and apparatus for maintaining thermal equalization of the operating parts of machine tools to control thermal expansion of the various components thereof.

2. Description of the Related Art

The art is replete with systems for controlling the accuracy of machine tools by sensing temperature differentials and providing correcting factors to guide the various machine tool components to insure an accurate drilling of various work pieces. Such correction systems are typified U.S. Pat. No. 4,211,129 issued to WITTKOPP. Such systems permit the finishing of the bore of the drilling of a hole independent of the instantaneous temperature of the particular work piece. As the spindles drill a particular work piece, heat is generated through friction of the drilling action and causes not only a heating up of the work piece but also a heating of the spindle and the rotor assembly of the motor. As a result, the heat transmitted to the spindle head and generated in the spindle head by its moving parts can cause inaccuracies in position due to thermal metal expansion. The control of the temperature of the drilling head is accomplished by introducing a cooling air or fluid through the stator assembly in order to compensate for the generated heat. Such a system is disclosed in U.S. Pat. No. 4,534,686 to NAKAMURA. Other means for controlling the generated heat include inserting an insulation unit between the spindle head and spindle drive motor as described in U.S. Pat. No. 5,580,471. Of particular note is U.S. Pat. No. 5,623,857 to SAKURABA in which the temperature change of a machine tool created by a heat generating source is detected by a temperature sensor. A temperature change having substantially the same time constant as the time constant of a thermal distortion of the machine tool is calculated by using the detected temperature change. The machining error introduced by this temperature change is then positionally corrected to compensate for the thermal distortion which corresponds to the calculated temperature change. As a result, the SAKURABA patent compensates for a thermal distortion in the machine tool and thereby increase its accuracy. All of these prior art devices essentially either prevent the heat from generating, or insulate the heat from other components of the machine tool or provide compensation factors to insure that the drilling point on the physical work piece remains in the same position. Most machine tools in the prior art rely on spindle carriage of granite, ceramic or other thermal expansion resistant material to minimize spindle position changes due to thermal differences in the system. These types of carriages are expensive and include significant mass. It would be desirable to include a carriage in such systems which is made of aluminum, steel or other lightweight material and of considerable strength and lower cost. However, these metals, as well as other substitute products, are subject to significant expansion and contraction caused by temperature changes. This invention provides a thermal equalization system and apparatus which permits the use of carriages constructed from metal or other materials which are subject to thermal expansion and contraction by the control of the environment in which the elements of the machine tool operates as opposed to simply calculating displacement corrections.

SUMMARY OF THE INVENTION

In order to maintain temperature equality between an aluminum carriage carrying the spindle and the work table to ensure drilling accuracy, a temperature controller to regulate temperature according to the working conditions (spindle speed, ambient temperature, coolant temperature, etc.) is required. Manually changing the chiller setting is ineffective due to human error and imprecision of control. It is more desirable to regulate the coolant flow than to regulate the coolant temperature, thereby obtaining faster thermal response. This is accomplished by including a coolant coil between the spindle housing and the carriage thereby preventing heat transfer to the carriage. However, the coolant line going to the spindles must be separated from the coolant line going to the coolant coil, because the spindle need a constant flow of coolant at all times. In addition, a heat source used to compensate for over cooling provided because the constant flow of coolant going to the spindle when the spindle is not running will over cool the spindle and its housing and thereby cool down the carriage causing thermal contraction of the aluminum carriage.

The thermal equalization system comprises a machine tool carriage preferably of aluminum but which could be made of other lightweight materials other than granite or ceramic carriages which may be a generally hollow rectangular beam structure or parallel beams having a number of supporting struts and spacers spaced between the same. This metal carriage is used in place of the granite or ceramic carriages of the prior art and the drilling spindle housing is mounted on the carriage in a fixed position the carriage. A plurality of spindle housings may be mounted on a single carriage to service work pieces mounted on a plurality of tooling plates mounted on the top of the work table to service several work pieces. In this way, the spindles are all ganged together and move in unison to drill the same patterns on workpiece mounted on the associated tooling plates.

As pointed out above, the separate chiller unit is used to provide coolant to the spindle to compensate for the heat generated by the spindle during drilling. This coolant delivery system continuously provides coolant to the spindle head and is set at a temperature below ambient which is suitable for the environment. That is, in high temperature environments a greater degree of cooling may be required. When the spindle is not drilling, excessive cooling of the spindle can result. Accordingly, the instant invention also includes, a new conductive rubber heating pad which is thermally coupled to the spindle housing to provide a heat source for the system to compensate for excessive cooling when the moving part of the spindle is not generating heat.

A plurality of electrically controlled valves for controlling the flow of coolant for the spindle housing of each spindles is mounted on the frame or elsewhere in the machine tool. A temperature sensor is mounted on the carriage behind each of the spindle housings and a separate sensor is mounted on the work table which generally remains at ambient Temperature sensors may be mounted near the tooling plates as well to provide a reading of temperature of the tooling plates for each of the associated spindle although a single temperature sensor mounted on the table frame is preferred. A control system mounted on the carriage senses the difference in temperature of the work table and the spindle housing and reduces or increases the temperature of the spindle structure by permitting an increased flow of chilling fluid to reduce the carriage temperature or applies electric current to the heating pad to increase the temperature of the carriage as required to equalize the temperature. This prevents heat transfer directly to the carriage by conduction from the back of the spindle housing thereby maintaining thermal expansion control between the carriage and the worktable. Temperature changes are initiated at a one quarter degree (¼°) temperature change threshold, although any increment can be selected depending on the environment. Care must exercised in the selection of the switching temperature to avoid either heating and cooling oscillations or temperature compensation delays which would impact the thermal expansion of the carriage.

DESCRIPTION OF THE PREFFERED EMBODIMENT

Figure 1:
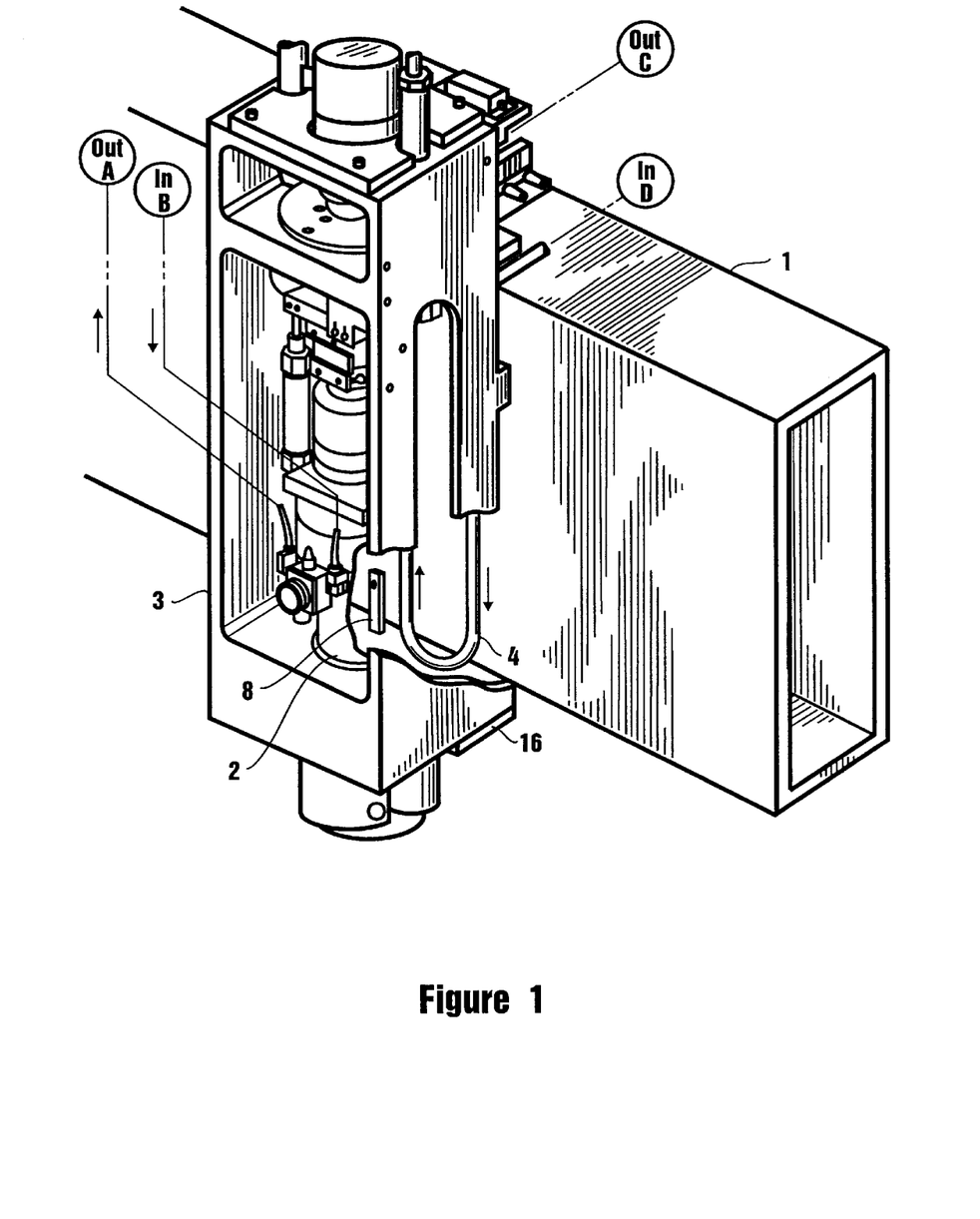
FIG. 1 is a perspective view of the spindle and spindle housing mounted on the carriage.
Figure 2:
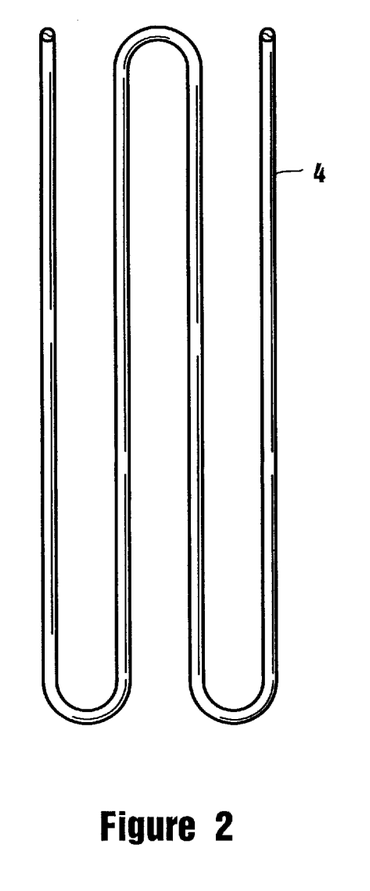
FIG. 2 is a view of the serpentine coil
Figure 3A:
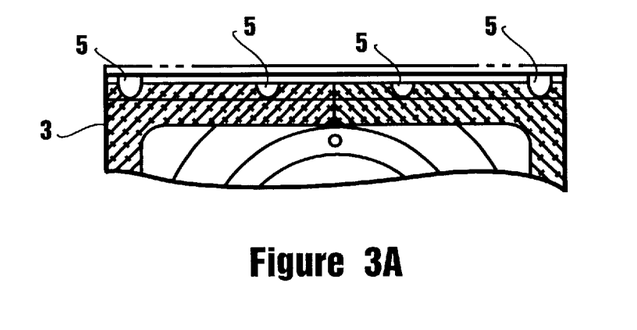
FIG. 3A is a top view of the rear section of the spindle housing showing the coolant coil recesses
Figure 3B:
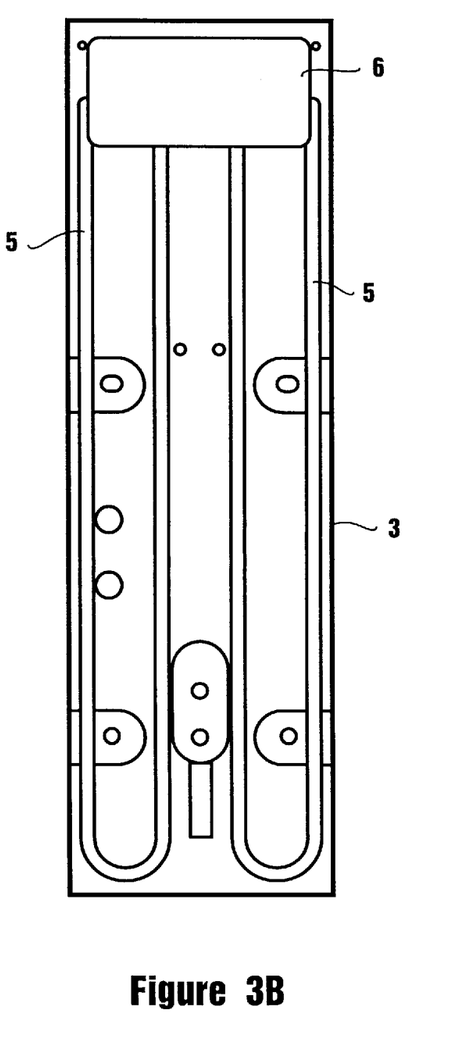
FIG. 3B is a rear view of the spindle housing showing the coolant coil recesses

Referring to FIG. 1, a machine tool of the instant invention is equipped with an aluminum carriage 1 and one or more spindles 2. Each spindle 2 is mounted in a spindle housing 3 which is fixedly attached to the carriage 1. Each spindle housing 3 has a four pass serpentine copper coil 4 imbedded in or fastened to the back of the spindle housing 3. FIG. 2 shows the serpentine coil 4 structure and FIGS. 3A and 3B show the serpentine recesses 5 (in the back of the housing 3) for receiving the serpentine coil 4. The coil 4 may be glued, soldered or otherwise fastened to the back of the spindle housing 3 so as to maintain thermal conductivity. However, since the coil is sandwiched between the spindle housing 3 and the carriage 1, it will remain in place when the spindle housing 3 is bolted or otherwise fastened to the carriage 1. The coil 4 is designed so it is in close contact with the spindle housing 3 as shown in FIGS. 3A and 3B and also in close proximity with the aluminum carriage 1 as shown in FIG. 1.

Figures 4, 5:
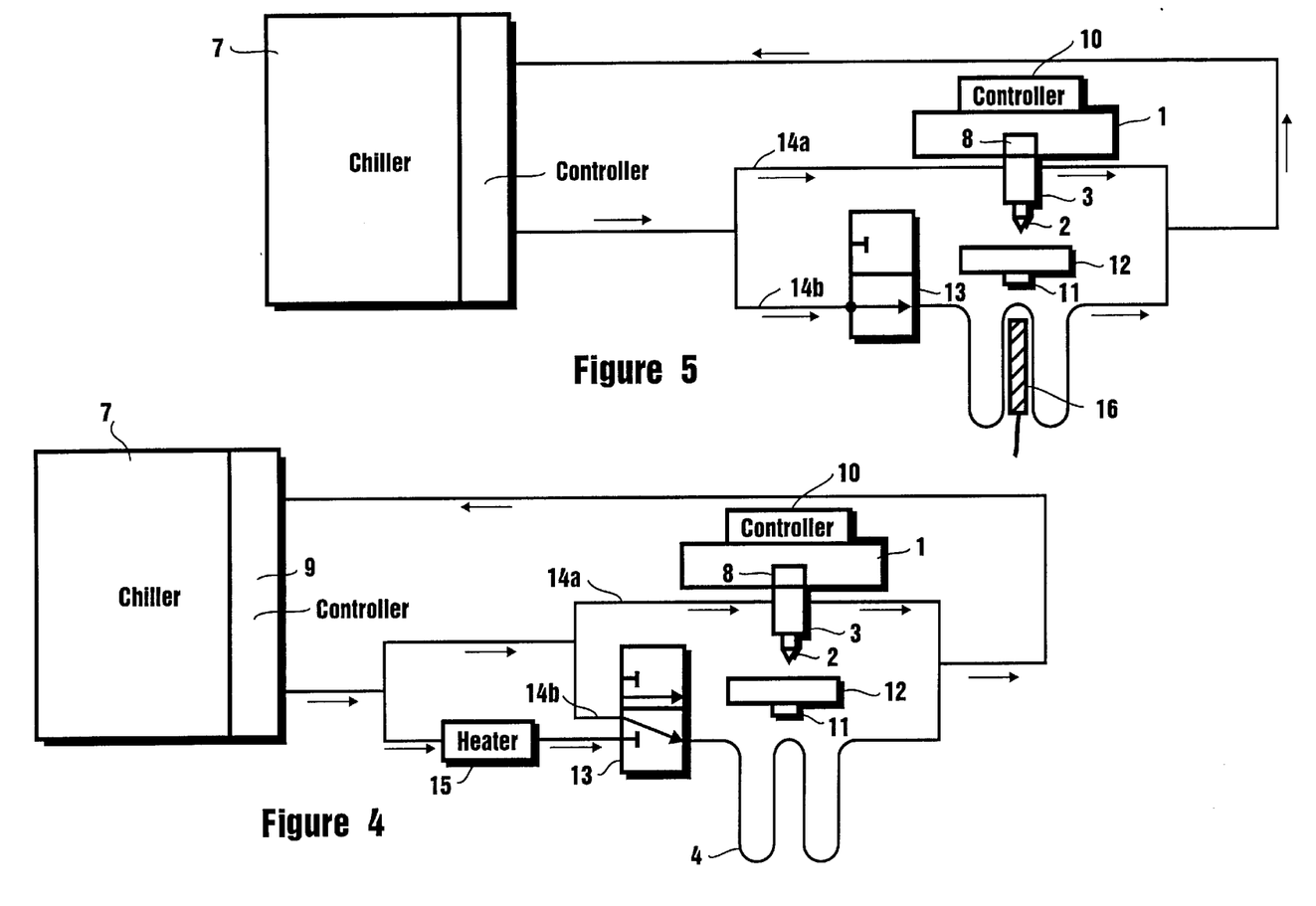
FIG. 4 is a schematic of one embodiment of the overall thermal equalization system.
FIG. 5 is a schematic of the preferred embodiment of the thermal equalization system.
Figure 6:
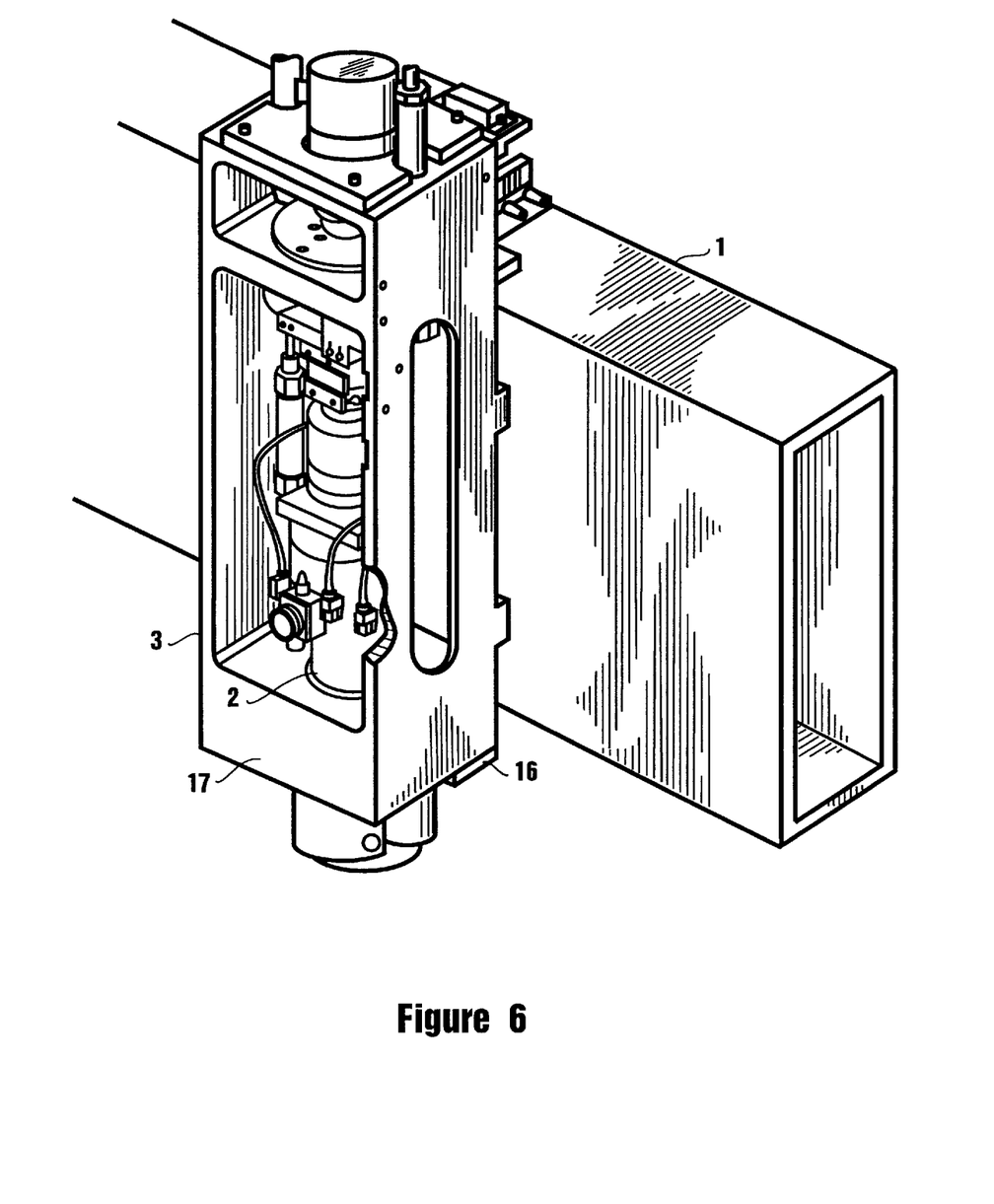
FIG. 6 is a perspective view of the spindle and spindle housing mounted on the carriage with the dial indicator used for Y axis testing.

FIG. 4 shows a schematic of the instant invention as used for testing for a single spindle housing 3 and spindle 2. A chiller 7 provides a coolant flow 14a through the head of spindle 2. In the preferred embodiment the chiller is an intelligent chiller programmed to maintain the coolant from 1° to 5° F. below ambient, although other temperatures may be selected dependent upon the environment. A 230 volt, 3 phase, Model No. 100 AC Schrieber chiller is utilized for this purpose. A Johnson & Johnson differential temperature controller 9 is used to maintain the desired coolant temperature. In addition, a deferential temperature controller 10 is mounted on the carriage 1 or elsewhere on the frame of the drilling machine. This controller 10 monitors the temperature sensor 8 mounted on the carriage 1 in back of the spindle housing 3 as shown in FIG. 1 and a separate temperature sensor 11 on or in close proximity to the work table 12. If a difference of more than ¼° C. is sensed, the controller 10 causes the electrically controlled valve 13 associated with the particular spindle housing to be opened and the coolant from the chiller passes through the serpentine coil 4 under control of the electrically controlled valve 13. There are two separate coolant paths 14a and 14b. 14a is used to provide coolant to the spindle 2 head, in a continuous manner. Path 14b is used to provide coolant to the serpentine coil 4 under control by the electrical valve 13. This design permits the use of a single chiller 7 to be utilized for cooling the head of the spindle 2 and to also be used in a controlled manner to allow coolant to flow through the serpentine copper coil 4 to chill the spindle housing 3 on a demand basis. Separate chilling or other cooling devices may also be used.

In most cases, the coolant temperature of the chiller 7 will be set at 4 to 5 degrees Fahrenheit below ambient. This setting can be adjusted depending upon the particular environment. With proper parameter settings, the drilling error factors along the X-axis can be significantly improved. This means that the size change of the aluminum carriage along the X-axis due to thermal changes can be controlled within acceptable tolerances. It has been determined that the coolant temperature and the ambient temperature each effect the drilling accuracy. This means that one set of fixed parameter settings will not necessarily work for all working conditions. When the machine is running an extended drilling program, for example, the ball nut on the Y-axis lead screw (not shown) will heat up because of the friction. Since the ball nut is mounted on the center of the back side of the table frame of the machine tool, the heat from the ball nut will be transferred to the frame and cause the frame to expand and this will cause the frame to bend and yaw at an angle. On a multispindle machine, the worst case Y-axis deviation always occurs on spindle number one and to a lesser degree on the Y-axis accuracy of spindle number two as well. Accordingly, the temperature control must regulate the coolant temperature according to the specific working conditions; that is, spindle speed, ambient temperatures, cooling temperatures, and so on, in real time rather than rely on a manual change of the chiller settings.

Several tests were run to evaluate the practical application of the described system and the effectiveness of a temperature controlled coolant system to control the growth of the aluminum carriage from the thermal energy induced by the spindles.

The determination of the placement and effectiveness of temperature control devices were tested. These tests all used a drilling machine fitted with an aluminum carriage. This test equipment comprises at least the following:

Test Equipment
1. An Excellon 2000 machine with an aluminum carriage.
2. Five spindle assemblies mounted on the carriage each with a cooling coil.

3. A refrigeration chiller with an ambient track controller.
4. The Zeiss Coordinate Measuring Machine (CMM) to measure drilled panels.
5. A thermally isolated house.
6. A BAG N400 air conditioner.

The drilling machine was set up in a thermally isolated house, to isolate the machine from the outside environment. The temperature inside the house was controlled by the BA N400 air conditioner.

The Excellon 2000 drilling machine was equipped with an aluminum carriage 1 and five drilling spindles 2. The five spindles 2 each were provided with a four pass, serpentine, copper coil 4 imbedded in the back of the spindle housing 3. Initially, the coolant from chiller was directed through the individual coolant coils before going to the individual spindles. However, in order to control the flow of the coolant through the coils without interruption of the flow of coolant through the spindle, the two flow paths were separated into 14a and 14b as shown in FIG. 4.

An ambient track temperature sensor 8 was mounted on the carriage, in back of each of the spindle housings 3, and another sensor 11 at or near the work table. An external chiller 7 was used to control the coolant temperature by tracking the ambient temperature and was adjustable to maintain the temperature at a selected level below ambient. The chiller temperature controller 9 used was a Johnson differential temperature controller which tracked the ambient temperature outside of the machine.

A separate controller 10 was used to track the difference in temperature from the worktable 12 (essentially ambient temperature) and that of the carriage 1 behind each of the spindle housings 3. This controller 10 activated an electrical valve to permit coolant to flow through the copper coil 4 in the spindle housing 3.

The drilling test program is a customized drilling program which initially drills 20,000 holes in each test panel mounted on table 12. After every 2,000 holes, 5 inspection holes are drilled on the panel for a total of 50 inspection holes. The drilling accuracy is determined based on the measurement of the 50 inspection holes, which are read on the Zeiss CMM and the average deviation of the 5 inspection holes from the expected location is determined. The water heater 15 was not used in Phase I.

Phase I tests commenced by setting several key parameters in several test situations. The first phase of such tests included 4 tests with parameters set as indicated in the following tables:

TABLE I

PHASE I

| | |
|---|---|
| Test #1 | Ambient Temperature 90 degrees F., Coolant Temperature 5 to 6 degrees F. below ambient, Spindle Speed 41,000 rpm. |
| Test #2 | Ambient Temperature 90 degrees F., Coolant Temperature 5 to 6 degrees F. below ambient, Spindle Speed 110,000 rpm. |
| Test #3 | Ambient Temperature 72 degrees F., Coolant Temperature 4 to 5 degrees F. below ambient, Spindle Speed 110,000 rpm. |
| Test #4 | Ambient Temperature 72 degrees F., Coolant Temperature 3 to 4 degrees F. below ambient, Spindle Speed 110,000 rpm. |

The results of the Phase I tests for the X and Y deviation for each of the five spindles are set forth in Tables T1 to T4 below:

TABLE T1

TEST #1

| SP.#1 | SP.#2 | SP.#3 | SP.#4 | SP.#5 |
|---|---|---|---|---|
| X - DEVIATION | | | | |
| −0.00003 | 0.00012 | 0.00005 | 0.00008 | −0.00012 |
| −0.00014 | 0.00029 | 0.00002 | 0.00004 | −0.00024 |
| 0.00017 | 0.0004 | 0.00002 | 0 | −0.00052 |
| 0.00046 | 0.00036 | −0.00005 | −0.00006 | −0.00052 |
| 0.00025 | 0.00024 | −0.00006 | −0.00024 | −0.00015 |
| 0.00038 | 0.00022 | −0.0001 | −0.00017 | 0.00022 |
| 0.00029 | 0.00015 | −0.0003 | −0.00009 | 0.00016 |
| 0.00017 | 0.0003 | −0.00022 | −0.00014 | −0.00002 |
| 0.00012 | 0.00019 | −0.0002 | 0 | −0.00013 |
| 0.0001 | 0.00018 | 0.00008 | 0.00001 | −0.00025 |
| Y - DEVIATION | | | | |
| 0.00039 | 0.00023 | 0.00015 | 0.00026 | 0.00024 |
| 0.00092 | 0.00044 | 0.00025 | 0.00013 | 0.00041 |
| 0.00099 | 0.00049 | 0.00021 | 0.00012 | 0.00015 |
| 0.00114 | 0.00086 | 0.00047 | 0.00021 | 0.0001 |
| 0.00249 | 0.00072 | −0.00015 | −0.00032 | 0.00013 |
| 0.00265 | 0.00055 | −0.00021 | −0.00055 | 0.00042 |
| 0.00239 | 0.00046 | −0.00033 | −0.00048 | 0.00042 |
| 0.00214 | 0.0005 | −0.0001 | −0.00012 | 0.00044 |
| 0.00193 | 0.00058 | 0.00028 | −0.00003 | 0.00029 |
| 0.00152 | 0.00077 | 0.00054 | 0.00025 | 0.00028 |

TABLE T2

TEST #2

| SP.#1 | SP.#2 | SP.#3 | SP.#4 | SP.#5 |
|---|---|---|---|---|
| X - DEVIATION | | | | |
| −0.00009 | −0.0001 | −0.00013 | −0.00005 | 0.00005 |
| 0.0002 | 0.00015 | 0.00013 | −0.00039 | −0.0002 |
| −0.00015 | −0.00012 | 0.00032 | −0.00009 | −0.00005 |
| 0.00014 | −0.00017 | 0.00039 | 0 | −0.00008 |
| 0.00036 | −0.00021 | 0.00041 | −0.00004 | −0.00024 |
| 0.00026 | −0.0004 | 0.00023 | 0.00014 | −0.00019 |
| 0.00018 | −0.00015 | 0.00022 | 0.00013 | 0.00019 |
| 0.00018 | −0.00026 | 0.00019 | 0.00006 | −0.00005 |
| 0.0003 | −0.00013 | 0.00027 | 0.00011 | 0.00014 |
| Y - DEVIATION | | | | |
| −0.0001 | 0.00036 | 0.00007 | 0.00025 | −0.00009 |
| 0.00012 | 0.00083 | 0.00061 | 0.00054 | −0.0003 |
| 0.00068 | 0.00039 | −0.00015 | −0.00012 | −0.00018 |
| 0.00152 | 0.00068 | −0.00018 | −0.00027 | −0.00039 |
| 0.00121 | 0.00132 | 0.00071 | 0.00033 | −0.00043 |
| 0.00045 | 0.00053 | 0 | 0.00012 | −0.00027 |
| 0.00088 | 0.00087 | 0.00024 | 0.00032 | −0.00033 |
| 0.00113 | 0.00082 | 0.00023 | 0.00024 | −0.0004 |
| 0.00168 | 0.00105 | 0.00007 | −0.00008 | −0.00044 |

TABLE T3

TEST #3

| SP.#1 | SP.#2 | SP.#3 | SP.#4 | SP.#5 |
|---|---|---|---|---|
| X - DEVIATION | | | | |
| −0.00023 | −0.00003 | 0.00012 | 0.00001 | −0.00005 |
| 0.00007 | 0.00011 | 0.00023 | −0.0001 | −0.00048 |
| 0.00024 | 0.00033 | 0.00041 | −0.00025 | −0.00069 |
| 0.00044 | 0.00061 | 0.00066 | −0.00033 | −0.00092 |
| 0.00023 | 0.0005 | 0.00055 | −0.00021 | −0.00063 |
| 0.00029 | 0.00059 | 0.00044 | −0.00027 | −0.00092 |
| 0.00035 | 0.00031 | 0.00043 | −0.00029 | −0.00093 |
| 0.0005 | 0.00052 | 0.00039 | −0.00023 | −0.00096 |

TABLE T3-continued

TEST #3

| SP.#1 | SP.#2 | SP.#3 | SP.#4 | SP.#5 |
|---|---|---|---|---|
| 0.00049 | 0.90051 | 0.00036 | −0.00045 | −0.00116 |
| 0.00053 | 0.00045 | 0.00027 | −0.00048 | −0.00102 |
| | | Y - DEVIATION | | |
| 0.00003 | −0.0002 | 0.00001 | −0.00002 | −0.00005 |
| 0.0002 | 0.00019 | 0.00016 | 0.00004 | 0.00011 |
| 0.00047 | 0.00035 | 0.00029 | 0.00017 | 0.00026 |
| 0.00083 | 0.00086 | 0.00074 | 0.00031 | 0.00021 |
| 0.00209 | 0.00069 | −0.00008 | −0.00012 | −0.00003 |
| 0.00183 | 0.00086 | 0.00036 | 0.00011 | 0.00012 |
| 0.00138 | 0.00092 | 0.0005 | 0.00016 | −0.00003 |
| 0.00129 | 0.00098 | 0.00089 | 0.00061 | 0 |
| 0.00148 | 0.00102 | 0.00031 | 0.00004 | −0.00016 |
| 0.00214 | 0.00074 | 0.00008 | −0.00001 | −0.00014 |

TABLE T4

TEST #4

| SP.#1 | SP.#2 | SP.#3 | SP.#4 | SP.#5 |
|---|---|---|---|---|
| | | X - DEVIATION | | |
| 0.00016 | 0.00004 | −0.00023 | −0.00007 | −0.00005 |
| −0.00022 | −0.00007 | −0.00017 | 0 | 0.00016 |
| −0.00019 | −0.00008 | −0.00005 | 0.00009 | 0.00058 |
| −0.00022 | 0.00001 | −0.00011 | 0.00012 | 0.00051 |
| −0.00005 | −0.00038 | −0.00017 | 0.00013 | 0.0003 |
| 0.00004 | −0.00027 | 0.00007 | −0.00001 | 0.00012 |
| 0.00018 | 0.00014 | −0.00017 | 0.00017 | 0.00017 |
| 0.00025 | 0.00018 | 0.00015 | 0.00001 | 0.00028 |
| 0.00021 | 0.00013 | 0.00006 | 0.00005 | 0.0001 |
| 0.00021 | 0.00027 | −0.00005 | −0.00015 | 0.00012 |
| | | Y - DEVIATION | | |
| −0.00011 | 0.00011 | −0.0001 | 0.00026 | −0.00018 |
| 0.0003 | 0.00035 | −0.00013 | 0.00012 | −0.00016 |
| 0.00029 | 0.00031 | 0.00002 | 0.00034 | −0.00003 |
| 0.00058 | 0.00054 | 0.00008 | 0.00034 | −0.00019 |
| 0.00027 | 0.00083 | 0.00047 | 0.00056 | −0.00032 |
| 0.00054 | 0.00103 | 0.00047 | 0.00082 | −0.00029 |
| 0.00053 | 0.00107 | 0.00058 | 0.00085 | −0.00012 |
| 0.00071 | 0.00097 | 0.00062 | 0.00081 | −0.00028 |
| 0.00076 | 0.00101 | 0.00068 | 0.00088 | −0.00012 |
| 0.00106 | 0.00116 | 0.00079 | 0.00093 | −0.00018 |

The results show that the steady state deviations along the X-axis are held very well on test #1, test #2 and test #4. Most being within 0.0005 inches. On test #3, some shrinkage of the beam is found along the X-axis. This indicates that the coolant temperature was set too low for this working condition. For the Y-axis accuracy, a non-uniform growth is found in all four tests with the worst case is always showing up on spindle #1.

CONCLUSIONS: PHASE I

With the proper parameter settings, the drilling accuracy along the X-axis can be maintained. This indicates that practical control of the size change of the aluminum carriage along the X-axis due to the thermal changes from the spindle and the ambient temperature is achievable.

Coolant temperature and the ambient temperature clearly affect the drilling accuracy and one set of fixed parameter settings will not necessarily work for all working conditions. Accordingly, some experimentation with specific parameters may be required.

When the machine is running a long drilling program, the ball nut on the Y-axis lead screw will heat up because of the friction. Since the ball nut is mounted on the center of backside of the table frame, the heat from the ball nut will be transferred to the frame and cause the frame to expand. Because of the off-center location of the ball nut and the spring-loaded air bearings on the frame, this heat expansion will cause the frame to bend and yaw at an angle and worst Y-axis deviation always occurred on spindle #1 and influenced the Y-axis accuracy of spindle #2 as well.

In Phase II the setup for Phase I remains the same except that a pre-calibrated temperature sensor 8 is mounted on the carriage 1, behind the spindle housing 3 adjacent each spindle housing mounting boss, where the heat is conducted to the carriage 1. A reference sensor 11 is mounted on the center of the front side of the machine work table frame.

An instant electrical water heater 15 is introduced into the cooling system as a heat source as shown in FIG. 4.

A new configuration cooling system with solenoid valves to switch the cooling line between cold and warm medium is included.

An electrical temperature controller 10, which controls the valve switching according to the temperature sensor feedback is also included.

The Phase II tests commenced by also setting several key parameters in several test situations. The first phase of such tests included 6 tests with parameters set as indicated in the following table:

TABLE II

| PHASE II, SETUP 1 | |
|---|---|
| Test #1. | Ambient Temperature 72 degrees F., Coolant Temperature 4 to 5 degrees F. below ambient, Spindle speed 50,000 rpm, Controller Active Margin within 1.0 degree F. |
| Test #2. | All settings remain the same as in test #1, except for an increase in the Spindle Speed to 110,000 rpm. |
| Test #3. | Ambient Temperature 92 degrees F., Coolant Temperature 5 to 6 degrees F. below ambient, Spindle Speed 50,000 rpm, Controller Active Margin within 1.0 degree F. |
| Test #4. | All settings remain the same as in test #3, except for an increase in the Spindle Speed to 110,000 rpm. |
| Test #5. | A repeat of the test #2, with a change to the Coolant Temperature to 5 to 6 degrees F. below ambient, and a change to the Controller Active Margin to within 0.5 degrees F.–. |
| Test #6. | A repeat of test #4 with a change to the Controller Active Margin to within 0.5 F. degrees. |

From test #1 to test #4 the temperature controller and cooling system were tested. For tests #5 and #6 one fixed temperature setting was chosen at a lower temperature differential.

The results of the six tests is set forth in Table T5 through T10.

TABLE T5

TEST #1

| SP.#1 | SP.#2 | SP.#3 | SP.#4 | SP.#5 |
|---|---|---|---|---|
| | | X - DEVIATION | | |
| −0.00024 | 0.00002 | 0.00026 | −0.00001 | −0.00013 |
| 0.00002 | 0.00018 | 0.00015 | −0.00016 | −0.00017 |
| −0.00012 | 0.00023 | 0.00009 | −0.00001 | −0.00012 |
| −0.00002 | 0.00054 | 0.00012 | −0.00028 | 0.0001 |
| −0.00017 | 0.00044 | 0.00035 | −0.00041 | −0.00033 |

TABLE T5-continued

TEST #1

| SP.#1 | SP.#2 | SP.#3 | SP.#4 | SP.#5 |
|---|---|---|---|---|
| −0.00025 | 0.00021 | 0.00054 | −0.00025 | 0.00042 |
| −0.00018 | 0.60045 | 0.00069 | −0.00047 | 0.00031 |
| −0.00039 | 0.00023 | 0.0005 | −0.00031 | 0.00052 |
| −0.00032 | 0.00024 | 0.00047 | −0.00037 | 0.00041 |
| −0.00023 | 0.00013 | 0.00044 | −0.0002 | 0.00014 |
| Y - DEVIATION ||||| 
| 0.00009 | 0.00003 | 0.00023 | −0.00003 | −0.0001 |
| −0.0001 | 0.00076 | 0.00035 | −0.00087 | 0.00032 |
| 0.00033 | 0.00054 | −0.00011 | −0.00044 | −0.0002 |
| 0.00028 | 0.00093 | 0.00058 | −0.0005 | 0.00002 |
| 0.00026 | 0.00098 | 0.00094 | 0.00021 | −0.00031 |
| 0.00068 | 0.00059 | −0.00029 | −0.00033 | −0.00014 |
| 0.00034 | 0.00083 | 0.00078 | 0.00016 | −0.00016 |
| 0.00056 | 0.00086 | 0.00018 | −0.00033 | 0.00032 |
| 0.00062 | 0.00089 | 0.00059 | −0.00087 | 0.00014 |
| 0.00053 | 0.00097 | 0.00029 | −0.00013 | 0.00006 |

TABLE T6

TEST #2

| SP.#1 | SP.#2 | SP.#3 | SP.#4 | SP.#5 |
|---|---|---|---|---|
| X - DEVIATION ||||| 
| 0.00031 | −0.00021 | −0.00003 | −0.00021 | −0.00002 |
| 0.00014 | −0.00023 | 0.00008 | −0.00021 | 0.00035 |
| 0.00017 | −0.00013 | 0.00021 | −0.00042 | 0.00051 |
| 0.00011 | −0.0001 | −0.00007 | −0.00058 | 0.00006 |
| 0.00011 | −0.0001 | 0.00021 | −0.00064 | −0.00009 |
| 0.00019 | −0.00014 | 0.00043 | −0.00055 | −0.00017 |
| 0 | −0.00017 | 0.0005 | −0.0003 | −0.00018 |
| 0.00022 | 0.00013 | 0.00046 | −0.00026 | 0.00013 |
| 0.00009 | 0.00011 | 0.00032 | −0.00031 | 0.00005 |
| Y - DEVIATION ||||| 
| 0.00002 | 0.0001 | −0.00037 | 0.00004 | 0.00029 |
| 0.00062 | −0.00058 | −0.00094 | −0.0005 | 0.00066 |
| 0.00065 | −0.00058 | −0.00022 | 0.00008 | 0.00045 |
| 0.0005 | −0.00018 | 0.00005 | 0.0005 | 0.00042 |
| 0.00086 | −0.00027 | 0.00033 | 0.00043 | 0.00066 |
| 0.0007 | −0.00023 | −0.00061 | 0.00047 | 0.00066 |
| 0.00097 | −0.00046 | −0.00046 | 0.00006 | 0.0006 |
| 0.00104 | −0.00035 | −0.00014 | 0.00012 | 0.00056 |
| 0.00111 | −0.00035 | 0.00004 | 0.00059 | 0.00071 |
| 0.00093 | 0.00048 | 0.00039 | 0.00096 | 0.00056 |

TABLE T7

TEST #3

| SP.#1 | SP.#2 | SP.#3 | SP.#4 | SP.#5 |
|---|---|---|---|---|
| X - DEVIATION ||||| 
| 0.00007 | −0.00043 | −0.00019 | −0.00024 | −0.00002 |
| 0.00029 | −0.00003 | −0.00016 | −0.00032 | −0.0001 |
| 0.0002 | −0.00005 | 0 | −0.00037 | −0.00003 |
| 0.00024 | 0.00005 | 0.00004 | −0.00027 | 0.00045 |
| 0.0004 | 0.0002 | 0.00008 | −0.00027 | 0.00047 |
| 0.00033 | 0.00024 | 0.00039 | −0.00027 | 0.00044 |
| 0.00043 | 0.00004 | 0.00034 | −0.00011 | 0.00059 |
| 0.00065 | 0.00008 | 0.00024 | −0.00007 | 0.00032 |
| 0.00062 | −0.00013 | 0.00018 | −0.00016 | 0.00011 |
| 0.00043 | −0.00015 | 0.00009 | −0.00028 | 0.00007 |
| Y - DEVIATION ||||| 
| 0.00042 | 0.00011 | 0.00023 | −0.00006 | 0.00012 |
| 0.00068 | 0.00013 | 0.00052 | 0.00016 | 0.00004 |

TABLE T7-continued

TEST #3

| SP.#1 | SP.#2 | SP.#3 | SP.#4 | SP.#5 |
|---|---|---|---|---|
| 0.00073 | 0.00022 | 0.00077 | 0.00013 | 0.00008 |
| 0.00074 | 0.00018 | 0.00056 | −0.00092 | 0.00074 |
| 0.00067 | 0.00025 | 0.00076 | −0.00042 | 0.00067 |
| 0.00068 | 0.00044 | 0.00092 | −0.00011 | 0.00059 |
| 0.00068 | 0.00019 | 0.00035 | −0.00039 | 0.00074 |
| 0.00052 | 0.00048 | 0.00083 | −0.00031 | 0.00051 |
| 0.00069 | 0.00031 | 0.00101 | 0.00027 | 0.00059 |
| 0.00079 | 0.0004 | 0.00106 | −0.00003 | 0.00066 |

TABLE T8

TEST #4

| SP.#1 | SP.#2 | SP.#3 | SP.#4 | SP.#5 |
|---|---|---|---|---|
| X - DEVIATION ||||| 
| −0.00032 | 0.0001 | 0.00001 | −0.00016 | 0.00001 |
| −0.00044 | 0.00008 | −0.00038 | −0.00015 | 0.00035 |
| −0.00033 | 0.00023 | 0.00023 | −0.00016 | −0.00004 |
| −0.00017 | 0.00037 | −0.0004 | −0.00026 | −0.00002 |
| 0.00011 | 0.00044 | −0.00051 | −0.00042 | −0.00005 |
| −0.00013 | 0.00031 | −0.00047 | −0.00035 | −0.00002 |
| 0.00023 | 0.00032 | −0.00053 | −0.00016 | 0.00015 |
| 0.00025 | 0.00016 | −0.00041 | 0.00003 | −0.00015 |
| 0.00015 | 0.0003 | −0.00013 | −0.0001 | −0.00039 |
| 0.00019 | 0.00037 | −0.00007 | −0.00016 | −0.00026 |
| Y - DEVIATION ||||| 
| −0.00007 | 0.00016 | −0.00008 | 0.00001 | 0.00003 |
| 0.00009 | −0.00022 | −0.00059 | −0.00093 | 0.00035 |
| −0.00011 | 0.00048 | −0.00032 | 0.00007 | 0.00003 |
| −0.00006 | 0.00032 | −0.0005 | −0.00011 | −0.0001 |
| −0.00004 | 0.00057 | −0.00059 | −0.00059 | 0.00016 |
| 0.00008 | 0.00003 | −0.00007 | −0.00008 | −0.00015 |
| 0.00039 | 0.00013 | −0.00111 | −0.00109 | 0.00042 |
| 0.00018 | 0.00057 | −0.00082 | −0.00074 | 0.00043 |
| 0.00012 | 0.00088 | −0.00016 | 0.00025 | −0.00002 |
| −0.00003 | 0.00086 | −0.00004 | 0.00019 | 0.00025 |

TABLE T9

TEST #5

| SP.#1 | SP.#2 | SP.#3 | SP.#4 | SP.#5 |
|---|---|---|---|---|
| X - DEVIATION ||||| 
| −0.00013 | −0.00001 | 0.00021 | 0.00029 | −0.00015 |
| −0.00012 | −0.00021 | 0.00003 | 0.00046 | −0.00021 |
| 0.00013 | 0.00004 | 0.00021 | 0.00049 | −0.00033 |
| 0.00015 | −0.00002 | 0.00017 | 0.00046 | −0.00029 |
| 0.00027 | −0.00007 | 0.00036 | 0.00046 | −0.0003 |
| 0.00032 | 0.00014 | 0.00037 | 0.00036 | −0.00022 |
| 0.00009 | 0.00006 | 0.00033 | 0.00028 | −0.00005 |
| 0.00022 | 0.00012 | 0.00035 | 0.00024 | 0.00015 |
| −0.00006 | 0.00004 | 0.00028 | 0.00015 | −0.00021 |
| −0.00006 | 0.00007 | 0.00028 | 0.00026 | 0 |
| Y - DEVIATION ||||| 
| −0.00018 | −0.00006 | −0.00008 | −0.00022 | −0.00005 |
| 0.0001 | −0.00025 | −0.00084 | −0.00074 | 0.00025 |
| 0.00029 | −0.00006 | −0.00023 | −0.00008 | −0.00007 |
| 0.00049 | −0.00009 | −0.00027 | −0.00022 | 0.00014 |
| 0.00069 | 0.00014 | −0.00024 | −0.00022 | 0.00016 |
| 0.0008 | −0.00023 | −0.00046 | −0.00014 | 0.00018 |

TABLE T9-continued

TEST #5

| SP.#1 | SP.#2 | SP.#3 | SP.#4 | SP.#5 |
|---|---|---|---|---|
| 0.00079 | −0.00012 | −0.00063 | −0.00047 | 0.00036 |
| 0.00076 | 0.00027 | −0.00025 | −0.00088 | 0.00038 |
| 0.00071 | 0.0003 | −0.00021 | −0.00003 | 0.00026 |
| 0.00087 | −0.00001 | −0.00054 | −0.00053 | 0.0004 |

TABLE T10

TEST #6

| SP.#1 | SP.#2 | SP.#3 | SP.#4 | SP.#5 |
|---|---|---|---|---|
| X - DEVIATION ||||||
| 0.00005 | −0.00019 | −0.00018 | 0.00006 | −0.00009 |
| 0.00012 | −0.00016 | −0.00008 | −0.00003 | −0.00028 |
| 0.00013 | 0.0001 | 0.00005 | −0.00015 | −0.00034 |
| 0.00015 | −0.00013 | 0.00013 | 0 | 0.00007 |
| 0.00019 | 0.00001 | 0.00007 | −0.00029 | −0.0001 |
| 0.00019 | 0.00003 | 0.00017 | −0.00027 | 0.00028 |
| −0.00006 | −0.00001 | 0.00005 | −0.00031 | 0.00016 |
| 0.00015 | 0.00013 | 0.00016 | −0.00006 | −0.00005 |
| 0 | 0.00025 | 0.00014 | −0.00008 | −0.00003 |
| 0.00012 | 0.00031 | 0.00005 | −0.00003 | −0.00016 |
| Y - DEVIATION ||||||
| 0.00003 | 0.00001 | 0.00025 | −0.0002 | −0.00033 |
| 0.00007 | 0.0007 | 0.00088 | 0.00055 | −0.00048 |
| 0.00032 | 0.00053 | 0.00099 | 0.00047 | −0.00069 |
| 0.00031 | 0.00041 | 0.00036 | 0.0001 | −0.00033 |
| 0.0006 | 0.00062 | 0.00126 | 0.00052 | −0.00036 |
| 0.00065 | 0.0006 | 0.00084 | −0.00016 | −0.00017 |
| 0.00106 | 0.00039 | 0.00112 | 0.0001 | −0.00001 |
| 0.00105 | 0.00058 | 0.00112 | 0.00072 | −0.00014 |
| 0.00117 | 0.00066 | 0.00123 | 0.00055 | 0.00004 |
| 0.00121 | 0.00084 | 0.00087 | 0.00069 | −0.00039 |

From Phase II test #1 to test #4, the temperature controller and the cooling system were tested and proved to be stable. The results show that the size change on the X-axis is well controlled with the worst case of hole deviation at 0.00069 inches, and most deviations are under 0.0005 inches. For test #5 and #6, one fixed setting and a smaller temperature controller acting margin were tested. The result indicated that the smaller coolant temperature range deviation used for control resulted in the less size change along the X-axis. In terms of the Y-axis accuracy, no improvements were found.

PHASE II, SETUP 2

For Phase II, setup 2, the machine setups remain almost the same as in setup #1, the only difference is that the heater is changed to a 50 watt flexible silicon rubber heating pad 16 instead of the instantaneous water heater 15. This heating pad is attached on the carriage 1, between the housing 3 and the carriage 1. The cooling system configuration is changed accordingly as shown in FIG. 5.

Procedure

Phase II was repeated using a 50 watt flexible silicon rubber heater instead of the instantaneous water heater.

The procedure followed setup #1 from test#1 to test#4, and the results are set forth in tables T11 to T14.

TABLE T11

TEST #1

| SP.#1 | SP.#2 | SP.#3 | SP.#4 | SP.#5 |
|---|---|---|---|---|
| X - DEVIATION ||||||
| −0.00018 | 0.00025 | 0.00007 | 0.0001 | 0.00003 |
| −0.00031 | 0.00027 | 0.00026 | −0.00033 | 0.00006 |
| −0.00003 | 0.00004 | 0.00028 | −0.00029 | 0.00001 |
| 0.00014 | 0.00005 | 0.00017 | −0.00076 | −0.0004 |
| 0.00012 | −0.00004 | 0.00034 | −0.00071 | −0.00035 |
| 0.00031 | −0.00011 | 0.00012 | −0.00052 | −0.00045 |
| 0.00053 | 0.00008 | 0.00007 | −0.00077 | −0.00037 |
| 0.00054 | −0.00017 | 0.00002 | −0.00053 | −0.00027 |
| 0.00026 | 0.00002 | −0.00008 | −0.00055 | −0.00019 |
| 0.00029 | 0.00003 | −0.00003 | −0.00059 | −0.00025 |
| Y - DEVIATION ||||||
| −0.00013 | 0.00021 | −0.00011 | −0.00002 | 0.00041 |
| 0.00006 | −0.00021 | −0.00066 | −0.00041 | 0.00056 |
| 0.00031 | −0.00022 | −0.00061 | −0.0005 | 0.00063 |
| 0.00032 | 0.00018 | −0.00003 | 0.00012 | 0.00064 |
| 0.00057 | −0.00004 | −0.00041 | 0.00004 | 0.00066 |
| 0.00083 | 0.00051 | 0.00015 | 0.00014 | 0.00083 |
| 0.00094 | 0.00069 | 0.00008 | 0.00035 | 0.00087 |
| 0.00117 | 0.00062 | 0.00016 | 0.00041 | 0.0012 |
| 0.00121 | 0.00079 | −0.00008 | 0.00043 | 0.0011 |
| 0.00108 | 0.00120 | 0.00038 | 0.0007 | 0.00122 |

TABLE T12

TEST #2

| SP.#1 | SP.#2 | SP.#3 | SP.#4 | SP.#5 |
|---|---|---|---|---|
| X - DEVIATION ||||||
| 0.00005 | −0.00019 | −0.00018 | 0.00006 | −0.00009 |
| 0.00012 | −0.00016 | −0.00008 | −0.00003 | −0.00028 |
| 0.00013 | 0.0001 | 0.00005 | −0.00015 | −0.00034 |
| 0.00015 | −0.00013 | 0.00013 | 0 | 0.00007 |
| 0.00019 | 0.00001 | 0.00007 | −0.00029 | −0.0001 |
| 0.00019 | 0.00003 | 0.00017 | −0.00027 | 0.00028 |
| −0.00006 | −0.00001 | 0.00005 | −0.00031 | 0.00016 |
| 0.00015 | 0.00013 | 0.00016 | −0.00006 | −0.00005 |
| 0 | 0.00025 | 0.00014 | −0.00008 | −0.00003 |
| 0.00012 | 0.00031 | 0.00005 | −0.00003 | −0.00016 |
| Y - DEVIATION ||||||
| 0.00001 | 0.00021 | −0.00029 | 0.00009 | 0.00024 |
| 0.00021 | 0.00009 | −0.00031 | 0 | 0.00007 |
| 0.00038 | 0.00005 | −0.00024 | 0.0002 | 0.00008 |
| 0.00043 | 0.00027 | −0.00044 | −0.00019 | 0.00054 |
| 0.00067 | 0.00006 | −0.00062 | −0.0004 | 0.0004 |
| 0.00088 | 0.00021 | −0.00022 | 0.00001 | 0.00041 |
| 0.00104 | 0.00034 | −0.00022 | −0.00001 | 0.00047 |
| 0.00126 | 0.00034 | −0.00024 | 0.00008 | 0.00046 |
| 0.00138 | 0.00049 | 0.00002 | 0.00008 | 0.00076 |
| 0.00131 | 0.00057 | 0.0002 | 0.00049 | 0.0006 |

TABLE T13

TEST #3

| SP.#1 | SP.#2 | SP.#3 | SP.#4 | SP.#5 |
|---|---|---|---|---|
| X - DEVIATION ||||||
| 0.00006 | 0.00013 | 0.00022 | 0.00015 | None |
| 0.00008 | 0.00011 | 0.00026 | 0.00001 | None |
| 0.00012 | 0.00028 | 0.00024 | 0.00013 | None |
| 0.00005 | 0.00032 | 0.00028 | 0.00015 | None |
| 0.00001 | 0.00014 | 0.00028 | 0.00028 | None |
| −0.00023 | 0.00012 | 0.00035 | 0.00005 | None |

TABLE T13-continued

TEST #3

| SP.#1 | SP.#2 | SP.#3 | SP.#4 | SP.#5 |
|---|---|---|---|---|
| −0.00021 | 0.00007 | 0.00016 | −0.00016 | None |
| −0.00022 | 0.00034 | −0.00002 | −0.00025 | None |
| 0.00004 | 0.00037 | 0.0002 | −0.00005 | None |
| 0.00005 | 0.00043 | 0.00016 | −0.0001 | None |
| Y - DEVIATION | | | | |
| 0.00034 | 0.00018 | 0.00002 | −0.0003 | None |
| 0.00023 | 0.00023 | 0.00007 | −0.00065 | None |
| 0.00034 | 0.00052 | 0.0003 | −0.00033 | None |
| 0.00064 | 0.00042 | 0.00006 | −0.00041 | None |
| 0.00083 | 0.00022 | −0.00002 | −0.00062 | None |
| 0.00075 | 0.00055 | 0.0003 | 0 | None |
| 0.00076 | 0.00043 | 0.00001 | −0.0002 | None |
| 0.00092 | 0.0005 | 0.00002 | −0.00072 | None |
| 0.0009 | 0.00068 | 0.00013 | −0.00053 | None |
| 0.00104 | 0.00054 | 0.00015 | −0.0004 | None |

TABLE T14

TEST #4

| SP.#1 | SP.#2 | SP.#3 | SP.#4 | SP.#5 |
|---|---|---|---|---|
| X - DEVIATION | | | | |
| −0.00002 | −0.00032 | −0.0002 | −0.00008 | −0.00005 |
| 0.00026 | −0.00032 | −0.00021 | −0.00009 | −0.00022 |
| 0.00033 | −0.0004 | −0.00034 | 0.00003 | −0.00023 |
| 0.00059 | −0.00047 | −0.00038 | −0.00036 | −0.00012 |
| 0.00037 | −0.00027 | −0.00052 | −0.00038 | −0.0001 |
| 0.00038 | −0.00031 | −0.0005 | −0.00047 | −0.0003 |
| 0.0002 | −0.00011 | −0.00039 | −0.00066 | −0.00031 |
| 0.00026 | 0.00011 | −0.00048 | −0.00045 | −0.00035 |
| 0.00024 | 0.00008 | −0.0003 | −0.0005 | −0.00051 |
| −0.00001 | −0.00011 | −0.00036 | −0.00032 | −0.00023 |
| Y - DEVIATION | | | | |
| −0.00009 | 0.00011 | −0.0001 | 0.00017 | −0.0002 |
| 0.00016 | 0.00015 | −0.00032 | 0.00005 | −0.00027 |
| 0.00028 | 0.00012 | −0.0003 | 0.00042 | −0.0003 |
| 0.00041 | 0.00009 | −0.00016 | 0.00023 | −0.00056 |
| 0.00051 | 0.00013 | −0.00069 | −0.00002 | −0.00028 |
| 0.00057 | 0.00043 | −0.00018 | 0.00013 | −0.00022 |
| 0.00076 | 0.00008 | −0.00033 | −0.00009 | −0.00005 |
| 0.00047 | 0.0003 | −0.00011 | 0.00023 | −0.00011 |
| 0.00074 | 0.0003 | −0.00016 | 0.00029 | −0.00018 |
| 0.00083 | 0.00008 | −0.00034 | 0.0002 | −0.00008 |

As Tables T11 through T14 show, the deviation along the X-axis is held very well. Although there was one sample error at 0.00077 inches, most were under 0.0005 inches. Since the carriage can not expand just in one special section, the 0.00077 inches deviation was ignored. The cooling system demonstrates a practical application of the temperature control system to control the X-axis deviation. For the Y-axis deviation, the results showed some improvements especially at normal ambient condition.

With both the water heater and the heating pad approaches, the drilling accuracy along the X-axis can be controlled within acceptable tolerances.

The temperature controller and cooling systems work well at different spindle speeds and at ambient temperature.

Phase III introduced specific testing for Y-axis control. The test machine setup remained as before.

Figure 7:
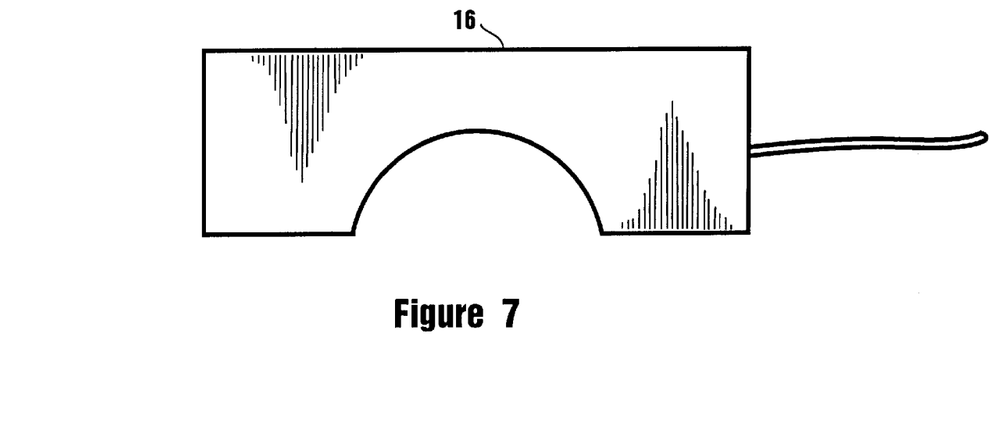
FIG. 7 is a planar view of the shape of the electrical heating pad.
Figure 8:
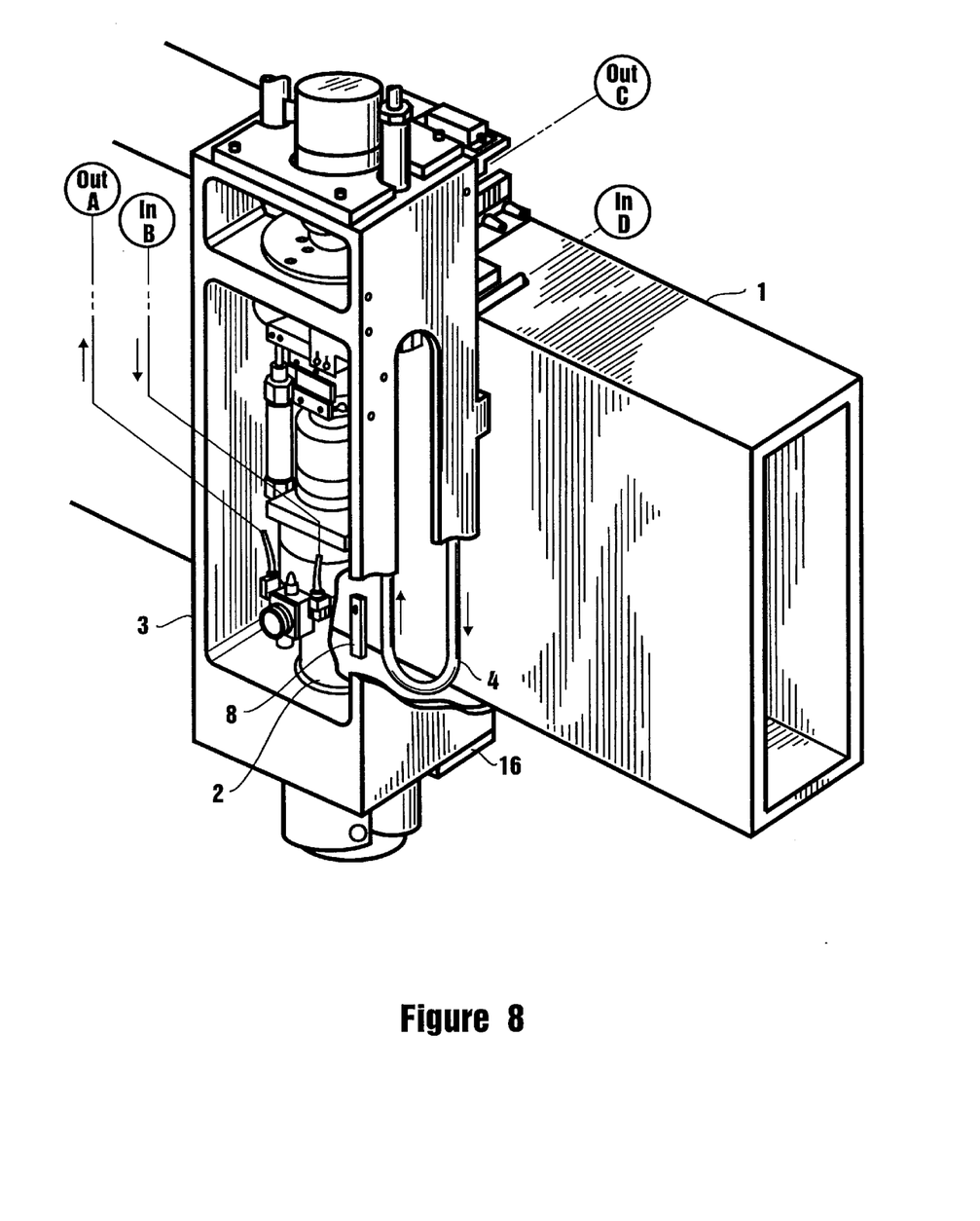
FIG. 8 is a perspective view of the preferred embodiment of spindle and spindle housing mounted on the carriage with coolant flow paths identified.

A dial indicator 17 was mounted on the front surface of the spindle housing as shown on FIG. 5. The indicator can sense a 0.00001 inch dimension change. Each spindle 2 was measured at different spindle speeds and coolant temperature settings. The carriage temperature change behind the spindle housing has a great effect on the spindle Y-axis accuracy. The source of the temperature change came from the heat exchange process switching between the cooling and heating cycle. The indicator showed a maximum Y-axis drift up to 0.0009 inches on spindle #4, with the coolant temperature set at 5 to 6 degrees Fahrenheit below the ambient temperature (72 degrees Fahrenheit) and the spindle speed set at 110K RPM. This temperature change affected the spindle Y-axis accuracy in different amounts for each spindle. This may have been caused by some mechanical factor, such as a carriage structure problem or an uneven cooling coil 4 contacting area, etc. In order to minimize the Y-axis deviation, the temperature change which occurs behind the spindle housing 3 must be controlled. The presence of the heating pad between the spindle housing and the carriage conducted heat into the carriage thereby inducing heat expansion effects in the carriage while maintaining a controlled temperature environment in the spindle housing. The heating pad 16 as shown in FIG. 7 was relocated to the bottom of the spindle housing as shown in FIG. 8 to direct heat to the spindle 2 head and the spindle Y-axis shift was measured again. The results show a dramatic improvement on the spindle Y-axis accuracy. A 0.0003 inches deviation was found instead of the 0.0009 inches drift found in the previous procedure at the same conditions. It is clear that spindle drift can therefore be controlled in both the X and the Y-axis by making the spindle housing temperature track the ambient temperature (i.e., control of the X-axis accuracy) and minimize the carriage temperature change behind the spindle housing 3 (i.e., control of the Y-axis accuracy). Applying heating pads 16 to fit the bottom shape of the spindle housing such as shown in FIG. 8 controls the manner in which heat is induced into the carriage 1 when control of spindle 2 head temperature is required. Other ways of controlling heat transfer to the carriage 1 will be clear to those skilled in the art and this invention is not limited to a heating pad 16 on the bottom of the spindle carriage. Heat elements could for example be included inside the spindle housing 3, or wrapped around the spindle 2 head. Additional heating coils could be located in the spindle housing 3 or wrapped about the spindle 2 head near the spindle 2 cooling coils. It is important to prevent compensating heat introduced into the system to penetrate to any significant degree to the carriage 1.

The setup for testing the heating pad 16 on the bottom of the spindle housing 3 retained the same machine setups. As with the rear mounted heating pad.

TABLE III

PHASE 3

| | |
|---|---|
| Test#1. | Ambient Temperature 72 degrees F., Coolant Temperature 3 to 4 degrees F. below ambient, Spindle Speed 50,000 rpm. |
| Test#2. | Keep the same settings as in test #1, except raise Spindle Speed to 110,000 rpm. |
| Test#3. | Repeat test #1 and raise Ambient Temperature to 82 degrees F. |
| Test#4. | Repeat test #2 and raise the Ambient Temperature to 82 degrees F. |
| Test#5. | Ambient temperature 92 degrees F., Coolant Temperature 5 to 6 degrees F. below ambient, Spindle Speed 50,000 rpm. |
| Test#6. | Keep the same settings as in test #5, except raise Spindle Speed to 110,000 rpm. |

The results as shown in tables T15 through T20 are very good on both axes. The carriage size change due to the thermal change is well controlled. Temperature monitoring showed that the carriage temperature was under controlled during the entire testing procedure. It was noted that coolant temperature needs to be set at 5 to 6 degrees Fahrenheit below the ambient temperature when the ambient temperature goes above 85 degrees Fahrenheit; since the machine needs cooler coolant to cool the spindle temperature down at a higher ambient temperature. For an ambient below 85 degrees Fahrenheit, a smaller temperature difference between coolant and ambient temperatures can maintain a higher drilling accuracy.

TABLE T15

TEST #1

| SP.#1 | SP.#2 | SP.#3 | SP.#4 | SP.#5 |
|---|---|---|---|---|
| X - DEVIATION | | | | |
| 0.00014 | 0.00015 | 0.00028 | 0.00017 | 0.00015 |
| 0.00018 | 0.00032 | 0.00025 | 0.00032 | 0.00008 |
| 0.00021 | 0.00034 | 0.00036 | 0.0002 | −0.0001 |
| 0.00029 | 0.00031 | 0.00041 | 0.00013 | −0.00007 |
| 0.00026 | 0.00007 | 0.00044 | 0.00013 | −0.00006 |
| 0.00014 | 0.00005 | 0.00056 | 0.00032 | 0.00008 |
| 0.00011 | 0 | 0.00049 | 0.00022 | 0.00003 |
| 0.00003 | 0.00005 | 0.00047 | 0.00037 | −0.00003 |
| 0.00001 | 0.00002 | 0.00042 | 0.00026 | −0.00019 |
| −0.00005 | 0.00011 | 0.00038 | 0.00022 | −0.00017 |
| Y - DEVIATION | | | | |
| −0.00022 | −0.0002 | −0.00006 | −0.00004 | 0.00017 |
| −0.00018 | −0.00018 | 0.00017 | 0.00012 | 0.00018 |
| −0.00001 | −0.00004 | 0.00013 | 0.00031 | 0.00002 |
| 0.00008 | −0.00012 | −0.00002 | 0.00028 | 0.00023 |
| 0.00008 | 0.00009 | 0.00029 | 0.00044 | 0.00028 |
| 0.0002 | 0.00007 | 0.00034 | 0.0003 | 0.00037 |
| 0.00033 | 0.00028 | 0.00025 | 0.00031 | 0.00044 |
| 0.00058 | 0.00014 | 0.00025 | 0.00054 | 0.00042 |
| 0.00041 | 0.00021 | 0.00039 | 0.0005 | 0.0005 |
| 0.00063 | 0.00033 | 0.00027 | 0.00051 | 0.00053 |

TABLE T16

TEST #2

| SP.#1 | SP.#2 | SP.#3 | SP.#4 | SP.#5 |
|---|---|---|---|---|
| X - DEVIATION | | | | |
| −0.00006 | 0.00006 | 0.00012 | 0.00017 | −0.0002 |
| −0.00002 | 0.00009 | 0.0003 | 0.00011 | −0.00031 |
| 0.00003 | 0.00023 | 0.00034 | 0.00001 | −0.00024 |
| 0.00002 | 0.00039 | 0.0004 | −0.00013 | −0.00021 |
| −0.00008 | 0.0004 | 0.00043 | −0.00007 | −0.0001 |
| −0.00018 | 0.00025 | 0.00035 | 0.0001 | −0.0002 |
| 0.00005 | 0.00021 | 0.0003 | 0.00007 | −0.00023 |
| 0.00012 | 0.00033 | 0.00028 | 0.0001 | −0.00048 |
| 0.00017 | 0.00046 | 0.00026 | −0.00013 | −0.00058 |
| 0.00001 | 0.00043 | 0.0004 | −0.00015 | −0.00039 |
| Y - DEVIATION | | | | |
| 0.00001 | −0.00004 | 0.00014 | 0.00011 | −0.00004 |
| 0.00027 | 0.00011 | 0.00035 | 0.00026 | −0.00007 |
| 0.00046 | 0.00005 | 0.00004 | 0.00013 | 0.00001 |
| 0.00051 | 0.00034 | 0.00021 | 0.00021 | 0.00002 |
| 0.00064 | 0.00047 | 0.00047 | 0.00039 | 0 |
| 0.00094 | 0.00027 | 0.00011 | 0.00011 | 0.00009 |
| 0.0007 | 0.0002 | 0.00033 | 0.00024 | 0.00003 |
| 0.00092 | 0.00054 | 0.00063 | 0.00054 | 0.00005 |
| 0.00081 | 0.00066 | 0.00054 | 0.00049 | 0.00006 |
| 0.00092 | 0.00028 | 0.00016 | 0.00026 | 0.00011 |

TABLE T17

TEST #3

| SP.#1 | SP.#2 | SP.#3 | SP.#4 | SP.#5 |
|---|---|---|---|---|
| X - DEVIATION | | | | |
| −0.0001 | 0.00001 | −0.00003 | −0.00022 | −0.00011 |
| −0.00015 | 0.0002 | 0.00011 | −0.00016 | 0.00003 |
| −0.00027 | 0.00034 | 0.00039 | −0.00008 | 0.00001 |
| −0.00009 | 0.00035 | 0.00033 | −0.00006 | 0.00021 |
| 0.00019 | 0.0003 | 0.0003 | −0.00012 | 0.00023 |
| 0.00005 | 0.00038 | 0.00036 | −0.00007 | 0.00023 |
| 0.00024 | 0.00029 | 0.00024 | −0.00002 | 0.00028 |
| 0.00035 | 0.00019 | 0.00024 | 0.00007 | 0.00027 |
| 0.00026 | 0.00029 | 0.00032 | 0 | 0.00008 |
| 0.00017 | 0.00018 | 0.00023 | −0.00003 | −0.00005 |
| Y - DEVIATION | | | | |
| 0.00011 | −0.00001 | 0.00001 | 0.00008 | 0.00018 |
| 0.00023 | −0.0003 | −0.00027 | 0.00002 | 0.00024 |
| 0.00026 | −0.00022 | −0.0002 | −0.00002 | 0.00028 |
| 0.00041 | −0.00032 | −0.00026 | 0.00012 | 0.00042 |
| 0.0005 | −0.00014 | −0.00011 | 0.00003 | 0.00046 |
| 0.00058 | −0.00003 | −0.00002 | 0.00028 | 0.00038 |
| 0.00056 | 0.00002 | 0.00006 | 0.00029 | 0.00039 |
| 0.00062 | −0.00004 | 0.00002 | 0.00021 | 0.00043 |
| 0.00068 | 0.00007 | 0.00011 | 0.00029 | 0.0004 |
| 0.00077 | −0.00013 | −0.00009 | 0.00017 | 0.00037 |

TABLE T18

TEST #4

| SP.#1 | SP.#2 | SP.#3 | SP.#4 | SP.#5 |
|---|---|---|---|---|
| X - DEVIATION | | | | |
| 0.0003 | −0.00029 | −0.00019 | −0.00016 | 0.00022 |
| 0.00039 | −0.00024 | −0.00016 | −0.00026 | 0.00014 |
| 0.00037 | −0.00024 | −0.00007 | −0.00047 | 0.00003 |
| 0.00035 | −0.00028 | −0.0001 | −0.00028 | 0.00004 |
| 0.00027 | −0.00008 | −0.00018 | −0.00043 | 0.00003 |
| 0.00001 | −0.00023 | −0.0002 | −0.00028 | 0.00001 |
| 0.00013 | −0.00019 | −0.00021 | −0.00021 | 0.00004 |
| 0.00026 | −0.00008 | −0.00019 | −0.00016 | 0.00018 |
| 0.00021 | −0.00012 | −0.00025 | −0.00013 | 0.0001 |
| 0.00015 | −0.00007 | −0.00008 | −0.00022 | 0.00011 |
| Y - DEVIATION | | | | |
| −0.00024 | −0.0001 | −0.00012 | −0.00009 | 0.00011 |
| 0 | 0.00014 | 0.00021 | 0.0001 | −0.00003 |
| 0.00017 | 0.00034 | 0.00027 | 0.00018 | 0.00003 |
| 0.00006 | 0.00013 | −0.0001 | −0.00005 | 0.00005 |
| 0.00048 | 0.00015 | 0.00001 | 0.00003 | 0.0001 |
| 0.00024 | 0.00031 | 0.00028 | 0.00003 | 0.0001 |
| 0.00038 | 0.00028 | 0.00004 | −0.00002 | 0.00017 |
| 0.00035 | 0.00037 | 0.00044 | 0.00021 | 0.00015 |
| 0.00054 | 0.00035 | 0.00012 | 0.00004 | 0.00017 |
| 0.00062 | 0.0004 | 0.00017 | 0.00012 | 0.00024 |

TABLE T19

TEST #5

| SP.#1 | SP.#2 | SP.#3 | SP.#4 | SP.#5 |
|---|---|---|---|---|
| X - DEVIATION | | | | |
| −0.00014 | −0.0001 | −0.00017 | −0.00004 | −0.00031 |
| −0.00031 | −0.00006 | −0.00022 | 0.00002 | −0.00022 |
| −0.00017 | 0.00003 | −0.00012 | −0.00009 | −0.00025 |
| −0.00031 | −0.00004 | −0.00016 | 0.00004 | −0.0001 |
| −0.00018 | −0.00001 | −0.00002 | −0.00009 | −0.0002 |
| −0.00045 | 0.00001 | −0.00005 | −0.00006 | −0.00022 |

TABLE T19-continued

TEST #5

| SP.#1 | SP.#2 | SP.#3 | SP.#4 | SP.#5 |
|---|---|---|---|---|
| −0.00013 | 0.00001 | 0.00002 | 0 | −0.00022 |
| −0.0003 | −0.00003 | −0.00011 | 0.00005 | −0.00025 |
| −0.00032 | 0.00008 | 0.00004 | 0.00001 | −0.00039 |
| −0.00042 | −0.00008 | −0.00001 | 0.00016 | −0.00025 |
| Y - DEVIATION | | | | |
| 0.00008 | −0.00005 | 0.00001 | −0.00008 | 0.00012 |
| 0.00026 | −0.00021 | −0.00002 | −0.00009 | 0.00007 |
| 0.00023 | 0.00011 | 0.00032 | −0.00002 | 0.00009 |
| 0.00035 | −0.00003 | 0 | −0.0001 | 0.00016 |
| 0.00035 | 0.00005 | 0.00025 | 0.00015 | 0.00005 |
| 0.00059 | 0.00013 | 0.00037 | 0.00017 | 0.00017 |
| 0.00043 | −0.00004 | 0.00014 | 0.00002 | 0.00031 |
| 0.00056 | 0.00006 | 0.00014 | 0.00012 | 0.00031 |
| 0.00059 | 0.00018 | 0.00046 | 0.00018 | 0.00017 |
| 0.0006 | 0.00008 | 0.00027 | 0.00007 | 0.0003 |

TABLE T20

TEST #6

| SP.#1 | SP.#2 | SP.#3 | SP.#4 | SP.#5 |
|---|---|---|---|---|
| X - DEVIATION | | | | |
| −0.0002 | 0.00026 | 0.00006 | −0.00003 | −0.00018 |
| −0.00037 | 0.0004 | −0.00009 | 0.00007 | 0.00008 |
| −0.00041 | 0.0004 | −0.00014 | −0.00009 | 0.00009 |
| −0.00017 | 0.00038 | −0.00002 | −0.00001 | −0.00006 |
| −0.00032 | 0.00032 | −0.00009 | 0.00005 | −0.00007 |
| −0.00066 | 0.00045 | −0.00018 | −0.00008 | 0.00014 |
| −0.00046 | 0.00033 | −0.00006 | −0.00011 | 0.00003 |
| −0.00033 | 0.00033 | 0.00006 | 0.00021 | −0.0001 |
| −0.00067 | 0.0003 | −0.00007 | 0.00001 | −0.00003 |
| −0.00045 | 0.00047 | −0.00014 | −0.00004 | 0.00013 |
| Y - DEVIATION | | | | |
| 0.00014 | 0.0005 | −0.00022 | 0.00019 | −0.00024 |
| 0.00025 | 0.00058 | −0.00008 | 0.00011 | −0.00034 |
| 0.00074 | 0.0008 | −0.00003 | 0.00026 | −0.00031 |
| 0.00075 | 0.00083 | −0.00003 | 0.00023 | −0.00034 |
| 0.00079 | 0.00094 | −0.00007 | 0.00023 | −0.00024 |
| 0.00094 | 0.00094 | −0.00011 | 0.00031 | −0.00021 |
| 0.00092 | 0.00079 | −0.0001 | 0.00022 | −0.00014 |
| 0.0009 | 0.00089 | −0.00011 | 0.00022 | −0.00011 |
| 0.00116 | 0.0009 | −0.00018 | 0.00022 | −0.00018 |
| 0.00127 | 0.00091 | −0.00015 | 0.00022 | −0.00009 |

With the heat exchange system of the instant invention, the aluminum carriage 1 size change due to the thermal change is well controlled.

Figure 9:
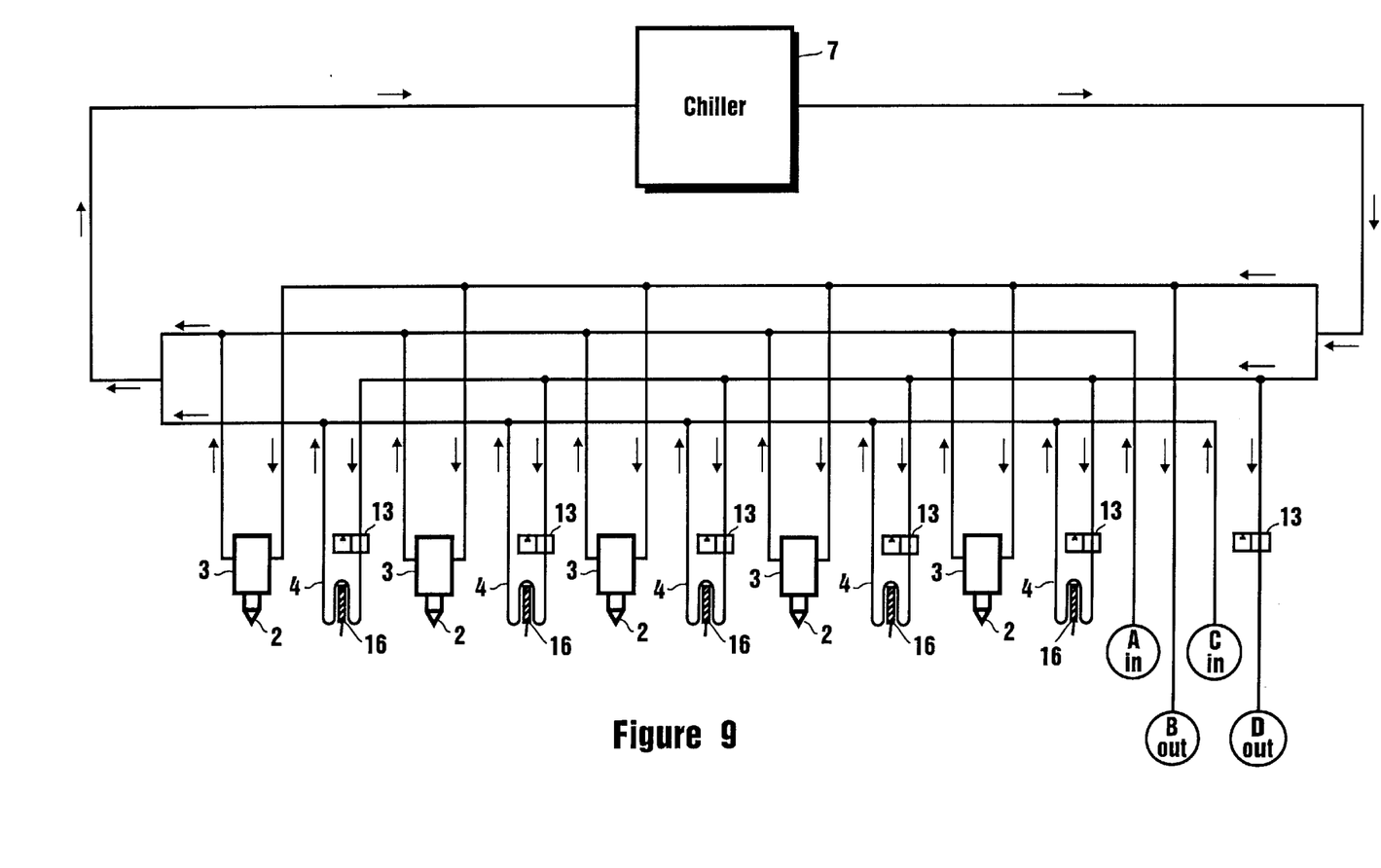
FIG. 9 is a schematic of the chiller heating control system for six spindles and the specific manner of interconnection to the spindle in FIG. 8.
Figure 10:
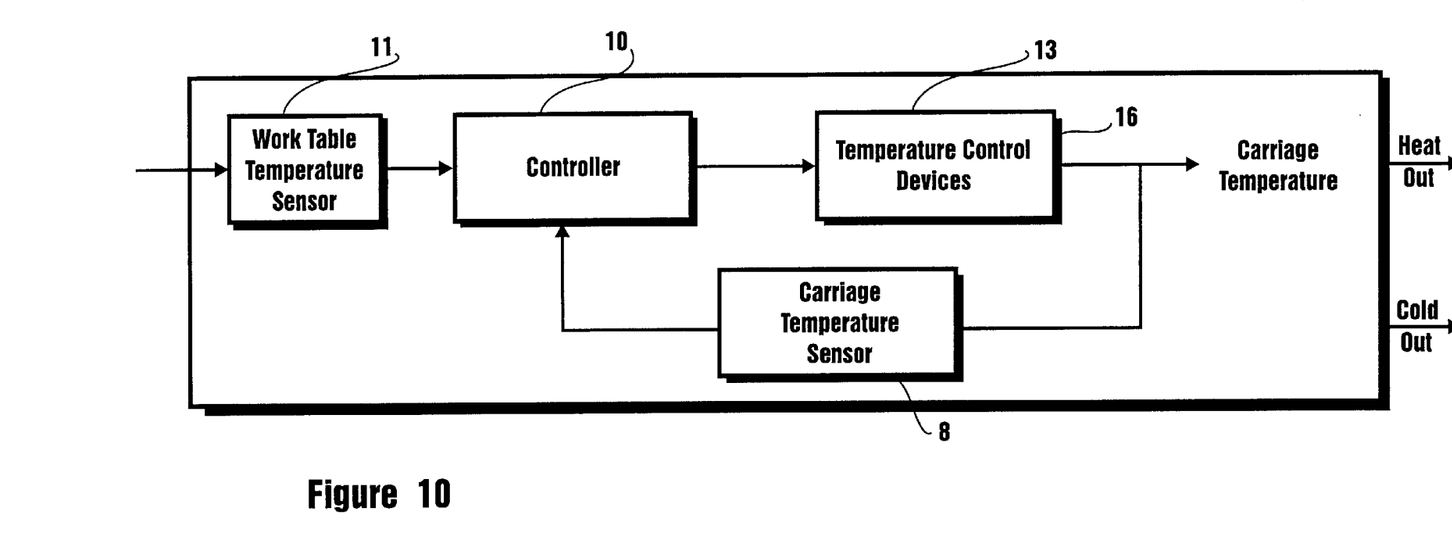
FIG. 10 is a schematic of the temperature sensing system, control devices and control system.

Therefore the preferred embodiment of the instant invention is temperature control system for a machine tool as shown in FIGS. 8, 9 and 10 having an aluminum carriage 1 upon which at least one or more spindles are mounted, each spindle having a housing 3 which includes a serpentine cooling coil 4 mounted on the back of the spindle housing and disposed between the spindle housing 3 and the carriage 1 and at least one work table 12 for supporting tooling plates for work operated on by each spindle 2. The spindle housing 3 has a temperature sensor 8 mounted on the carriage 1, between the housing 3 and the carriage 1 for sensing the temperature of the carriage 1. Since the work table 12 is generally at ambient it has a temperature sensor 11 mounted on or near the center front of the worktable 12 frame to sense the worktable 12 temperature. The cooling coils 4 for each spindle are connected to a chiller which maintains the coolant in the coils 4 at a selected temperature below ambient. A coolant delivery system is controlled by a controller 10 which operates electrically controlled valves 13 to cool the spindle housing 3 and prevent a heat transfer to the carriage 1. Each of the spindles 2 also has a heating pad 16 mounted thereon which is disposed at the bottom of the spindle housing 3 away from the carriage 1. The controller 10 for determining the difference in temperature of the housing 3 and the worktable 12 energizes the heating pad 16 to heat the spindle housing 3 in the event of excessive cooling. The controller 10 is set to operate on temperature differentials of ±¼° F. although any temperature setting appropriate for the environment may be used.

Modifications and improvements based on new technology will be apparent to those skilled in the art and the invention disclosed herein is not to be limited to the specific hardware and method disclosed.

Having thus described the invention what is claimed is:

1. A thermal equalization system for heat generating equipment comprising:
   a. a cooler;
   b. a carriage mounted on said heat generating equipment;
   c. a first operating apparatus having a housing mounted on said carriage;
   d. a first temperature sensor for detecting the temperature of said first operating apparatus housing;
   e. at least one coolant coil attached to said cooler mounted between said first operating apparatus housing and said carriage;
   f. a second apparatus; associated with said first operating apparatus;
   g. a second temperature sensor for detecting the temperature of said second apparatus;
   g. a temperature difference determining apparatus for determining the difference in temperature between said first temperature sensor and said second temperature sensor; and
   h. a control apparatus for selectively introducing a coolant from said cooler into said coolant coil said coolant being introduced into said coils on detecting temperature difference above a first selected temperature difference threshold.

2. A thermal equalization system as described in claim 1 which includes a heating apparatus coupled to said control apparatus and wherein said control apparatus introduces coolant when said temperature difference is above said first selected temperature difference threshold and energizes said heating apparatus when said temperature difference is below a second selected temperature.

3. A thermal equalization system as described in claim 1 wherein said difference determining apparatus is a differential controller and said cooler is a cooling chamber which receives a coolant which is cooled to a temperature below said second operating apparatus operating temperature said coolant being applied to said chamber by an electrically operable valve and wherein said differential controller sends a signal to open said valve when said temperature differential is greater than said first selected temperature threshold and closes said valve when said temperature differential is less than a second selected temperature differential threshold.

4. A thermal equalization system as described in claim 3 wherein said cooler cools said coolant to a selected temperature below said temperature sensed by said second temperature sensor.

5. A thermal equalization system as described in claim 1 wherein said heat generating equipment comprises a machine tool and said first operating apparatus is a drill spindle and said second apparatus is a machine tool work table.

6. A thermal equalization system as described in claim 5 wherein said carriage is made of aluminum.

7. A thermal equalization system as described in claim 6 wherein there are a plurality of spindles mounted on said carriage each having a housing with a coolant coil disposed between at least one of said housings and said carriage.

8. A thermal equalization system as described in claim 7 further comprising: a heating source mounted on at least one of said housings for heating said housing on determining said temperature difference is less than a second selected temperature difference threshold.

9. A thermal equalization system as described in claim 1 wherein said heat generating equipment comprises a machine tool and said first operating apparatus is a drill spindle and said second apparatus is the machine tool table.

10. A thermal equalization system for controlling thermal expansion of machine tool elements in a machine tool comprising:
   a. a coolant source;
   b. a spindle mounted in a spindle housing;
   c. a metal carriage supporting said spindle housing moveably disposed in said machine tool;
   d. a first temperature sensor mounted on said carriage at said spindle housing for sensing the temperature at said housing;
   e. at least one coolant coil mounted on the outside of said spindle housing and adjacent said carriage for selectively receiving said coolant;
   f. a work table moveable relative to said spindle;
   g. a second temperature sensor mounted on said work table adapted for sensing the temperature of said work table;
   h. a heater mounted on said housing adjacent said carriage;
   i. a differential amplifier for determining the difference in temperature between said spindle housing and said work table;
   j. a controller responsive to said difference in temperature for applying the coolant from said cooler to said coolant coils of said spindle housing until said difference in temperature between said carriage at said housing and said work table is below a selected difference; and
   k. a controller responsive to said difference in temperature for applying heat from said heater to said spindle housing until said difference in temperature between said carriage and said work table is above a selected difference.

11. A thermal equalization system as described in claim 10 wherein said carriage is aluminum.

12. A thermal equalization system for controlling thermal expansion of a metal spindle carriage in an operating machine tool comprising:
   a. a coolant controller for cooling a coolant to a selected temperature below ambient;
   b. a spindle having a housing with a coolant channel coupled to said said coolant cooled by said coolant controller said spindle housing mounted on an aluminum carriage with said coolant channels disposed adjacent said housing and said carriage;
   c. a cooling coil mounted in said spindle housing channel and disposed between said housing and said carriage;
   d. an operating apparatus mounted on said machine tool;
   e. a plurality of temperature sensors, at least one of which is mounted on the work table and at least one other of which is mounted on said carriage between said spindle and the cooling coil;
   f. a differential controller coupled to said temperature sensors for sensing the difference between the work table temperature and the operating apparatus temperature and controlling the flow of coolant through said coolant coils.

13. A thermal equalization system comprising:
   a. a selectable source of a coolant;
   b. a selectable source of heat;
   c. a first apparatus for selectively applying said coolant or said heat;
   d. a first temperature sensor for detecting the temperature of said first operating apparatus;
   e. a second operating apparatus; operated in association with said first operating apparatus;
   f. a second temperature sensor for detecting the temperature of said second operating apparatus;
   g. a difference determining apparatus for determining the difference between said first and second temperature sensors; and
   h. a valve for controlling the flow of said coolant to said first apparatus having an open and a closed position, said valve being positioned to said closed or said open position on detecting temperature difference below or above a selected temperature difference threshold;
   i. a first controller for operating said coolant valve on detecting a difference between said first and second temperature sensors representing a temperature of said first operating apparatus above said temperature of said second operating apparatus; and
   j. a second controller for applying said source of heat to said housing on detecting a difference between said first and second temperature sensors representing a temperature of said first operating apparatus below said temperature of said second operating apparatus.

14. A thermal equalization system as described in claim 13 wherein said valve is opened when said temperature difference is above said selected temperature difference and is closed when said temperature difference is below said selected temperature difference.

15. A thermal equalization system as described in claim 13 wherein said difference determining apparatus is a differential controller and said valve is an electrically operable valve and wherein said deferential controller sends a signal to open said valve on when said temperature differential is greater than a selected temperature differential and closes said valve when said temperature differential is less than a selected temperature differential.

16. A thermal equalization system as described in claim 13 further comprising a differential temperature controlled cooler for cooling said coolant fluid to a selected temperature below ambient.

17. A thermal equalization system as described in claim 13 where said first operating apparatus includes cooling coils through which the fluid may pass on opening of said valve.

18. A thermal equalization system as described in claim 13 wherein said first operating apparatus is a drill spindle and said second apparatus is a work table.

19. A thermal equalization system as described in claim 18 wherein said drill spindle is mounted on a metal carriage, which is movable longitudinally thereof.

20. A thermal equalization system as described in claim 19 wherein said metal carriage is made of aluminum.

21. A thermal equalization system as described in claim 20 wherein there are a plurality of spindles and a plurality of tooling plates on worktables.

22. A thermal equalization system as described in claim 21 wherein said coolant coils are disposed between said spindle and said carriage.

23. A thermal equalization system for controlling thermal expansion in metals comprising in an operating machine tool comprising;

a. a coolant source;

b. a spindle mounted in a spindle housing;

c. a metal carriage supporting said spindle housing;

d. a first temperature sensor mounted adjacent said carriage at said spindle housing for sensing the temperature of said carriage;

e. coolant coils mounted in said spindle housing in juxtapositon to said carriage;

f. a movable work table moveable relative to said spindle;

g. second temperature sensor mounted adjacent said work table for sensing the temperature of said work table;

h. a coolant coil mounted on said housing between said spindle housing and said carriage;

i. a differential amplifier for determining the difference in temperature between said spindle housing and said work table; and     j. a controller responsive to said difference in temperature for directing the coolant from said coolant source to said coolant coils of said spindle housing until said difference in temperature between said spindle housing and said work table is below a selected difference.

24. A thermal equalization system as described in claim 23 wherein said carriage is aluminum.

25. A thermal equalization system for controlling thermal expansion of a metal spindle carriage in an operating machine tool comprising:

a. a coolant controller for cooling a coolant to a selected temperature below ambient;

b. a spindle having a housing;

c. said spindle moveably mounted on an aluminum carriage;

d. a cooling coil mounted in said spindle housing and disposed between said housing and said carriage for selectively receiving coolant;

e. an operating apparatus mounted on said machine tool;

f. a plurality of temperature sensors, at least one of which is mounted on the work table and at least one other of which is mounted on said carriage between said spindle and the cooling coil;

g. a controller coupled to said temperature sensors for sensing the difference between the spindle housing temperature and the operating apparatus temperature and controlling the flow of coolant through said coolant coils.

* * * * *